Dec. 15, 1964   J. L. WALLACE ETAL   3,160,915
APPARATUS FOR CONTINUOUSLY ADVANCING PLASTIC MATERIALS
ALONG THE FLIGHTS OF AN EXTRUDER SCREW
Filed Jan. 31, 1962                           2 Sheets-Sheet 1
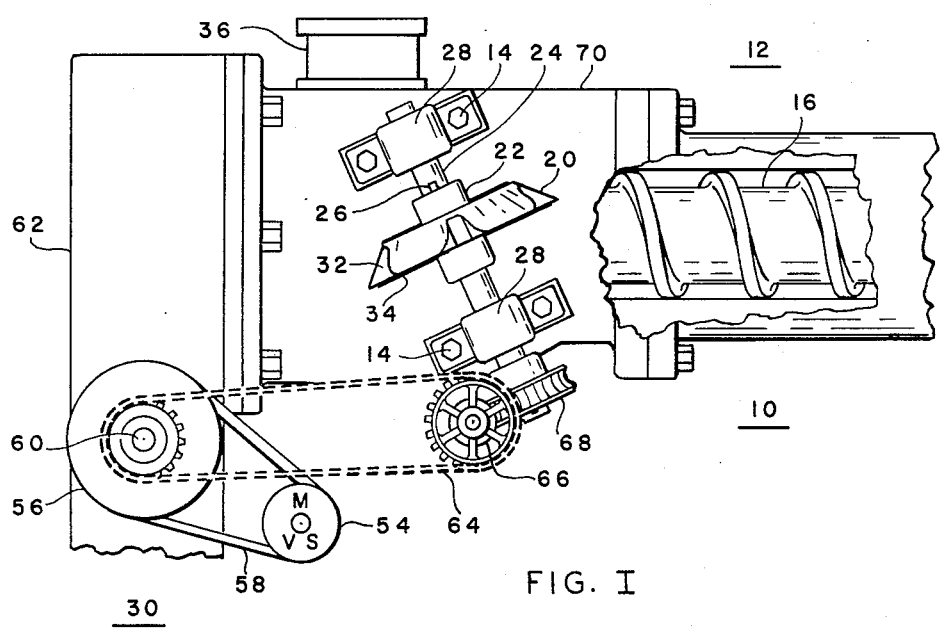
FIG. I
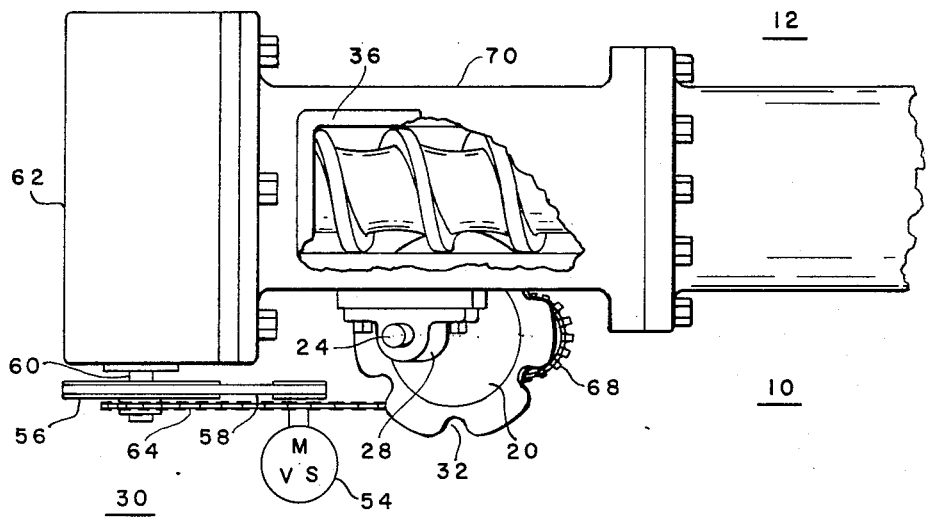
FIG. II
GEORGE C. VINCENT
JAMES L. WALLACE   } INVENTORS.
BY Arthur E Hoffman
AGENT.

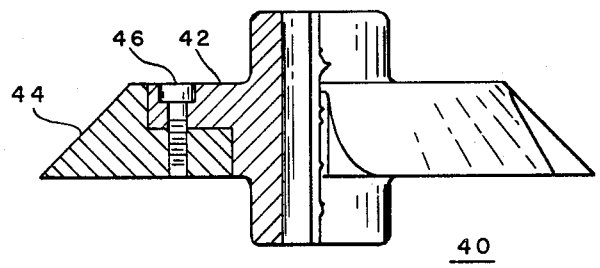
FIG. III
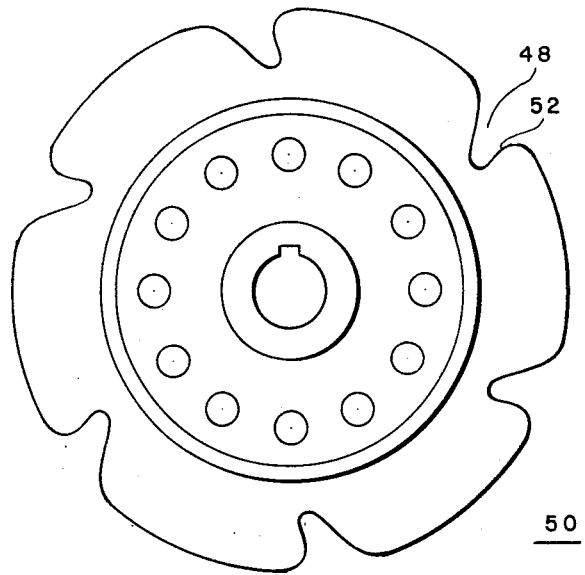
FIG. IV

United States Patent Office 3,160,915
Patented Dec. 15, 1964

3,160,915
APPARATUS FOR CONTINUOUSLY ADVANCING PLASTIC MATERIALS ALONG THE FLIGHTS OF AN EXTRUDER SCREW
James L. Wallace, Wilbraham, Mass., and George C. Vincent, 42 Decorie Drive, Wilbraham, Mass.; said Wallace assignor to Monsanto Company, a corporation of Delaware
Filed Jan. 31, 1962, Ser. No. 170,044
2 Claims. (Cl. 18—12)

This invention relates to apparatus for the continuous extrusion of plastic materials. More particularly, this invention relates to an extruder having mounted thereon apparatus designed to continuously advance plastic materials along the flights of an extruder screw.

Conventional extruders for plastic materials comprise, generally, an elongated hollow casing provided with heating means and a driven rotatable screw mounted in the casing to advance plastic material therethrough.

In operation, the plastic material is usually fed to the extruder in a solid granular condition alone or in physical admixture with plasticizers, colorants, fillers, etc. As the plastic material is advanced through the casing by the screw it is heated to a pliable condition where it is colloided and blended with such additives as may be present in order to form a homogeneous composition.

The efficiency of extrusion depends to a large extent on the rate of material advance along the screw. The rate of material advance depends in turn on the the speed of screw rotation, the physical characteristics of the screw and bore, and the coefficient of friction between (1) the plastic material and the heated internal surface of the bore, (2) the plastic material and the surface of the screw and (3) the individual particles of material being extruded.

In general, for any given extruder screw if the coefficient of friction is high between the material and the bore surface and also between the individual particles of material, the efficiency or rate of material advance along the screw will also be high. The frictional coefficients of most granular materials are generally adequate for most extrusion operations. However in the case of fine powdered or smooth bead-like materials, the frictional coefficients may be so low as to prevent extrusion.

Accordingly, it is the principal object of the present invention to control material feed to an extruder.

Another object is to provide apparatus and means for continuous advancement of materials along the axis of an extruder screw.

A further object of the present invention is to provide apparatus and means for continuous advancement of finely powdered and smooth bead-like materials possessing low coefficients of friction along the axis of an extruder screw.

Other objects of the present invention will in part be obvious and will in part appear hereinafter.

These and other objects are attained by providing apparatus, adapted for controlling material feed to a screw operated extruder comprising, in combination, a truncated cone notched at equi-intervals along its periphery and having its large diameter oriented relative to the direction of extruder discharge, positioned such that a segment of said plate intersects the extruder casing to mesh substantially perpendicularly with the flights of said screw adjacent to the extruder feed inlet, a center shaft affixed axially to said truncated cone and rotatably mounted on bearing supports and means for rotating both the truncated cone and the screw at predetermined meshing speeds whereby material being fed to the extruder is forcibly advanced along a path substantially parallel to the longitudinal axis of the screw.

The following drawings are provided for the purpose of illustrating various embodiments of the present invention.

FIGURE I is a side view, partly in section and with parts broken, illustrating an embodiment of the present invention for controlling material feed to an extruder.

FIGURE II is a top view, partly in section and with parts broken, of the same embodiment shown in FIGURE I.

FIGURE III is a side view magnified and partly in section, illustrating one embodiment of the chamfered circular plate used in the present invention.

FIGURE IV is a fragmentary front view, magnified and with parts broken, illustrating plate detail of the embodiment shown in FIGURE III.

Referring in detail to the figures of the drawings and more specifically FIGURES I and II, there is schematically shown a feed control apparatus 10 mounted on the side of an extruder 12 by any suitable means such as bearing bolts 14 for the purpose of advancing plastic materials along extruder screw 16. Specifically, the feed control apparatus 10 includes a rotatable member comprising a chamfered circular plate 20 shaped in the form of a truncated cone provided with a center hub 22 affixed axially to center shaft 24 by means of key and keyway slot 26. Center shaft 24 is rotatably mounted on a pair of bearing supports 28—28 and driven by motor means 30.

The chamfered circular plate 20 is provided with peripheral notches 32 shaped to mesh with the flights of screw 16 and intersect the extruder casing through slot 34 adjacent to the extruder feed inlet 36 in the direction of extruder discharge. Although the angle of mesh between the screw 16 and the chamfered circular plate 20 may vary, it is preferable that the notches 32 mesh substantially perpendicularly with the flights of screw 16 for minimum clearance. In any event, it is essential that the planar surface of plate 20 present an obstacle against rotational movement of the material about the axis of the screw with the result that the material is forcibly advanced forwardly parallel to the axis of said screw by the wedging action of the forwardly moving flight surfaces.

It is essential that the meshing element of the feed control apparatus be circular and chamfered at its peripheral edge to prevent jamming by compression of solid feed material between the periphery of the meshing element and the surface of the screw between the flights (screw root).

For optimum results, it is preferable that the meshing element of the feed control apparatus be shaped in the form of a truncated cone and positioned such that its largest diameter be oriented relative to the direction of extruder discharge. However, if desired, the truncated cone may be oriented opposite to that preferred or the peripheral edge may be wedge shaped rather than conical.

A modified embodiment of the chamfered circular plate is shown in FIGURE III wherein the chamfered circular plate or truncated cone 40 comprises a round disc 42 and a notched and chamfered removable rim 44. The removable rim 44 can be attached to the periphery of disc 42 by any suitable means such as a plurality of bolts 46 extending through complementary abutting portions of the rim and disc. The removable rim 44 is designed for ease of replacement particularly when portions of the rim become worn.

A further refinement of the chamfered circular plate is illustrated in FIGURE IV wherein the notches 48 around the periphery of the partially shown circular plate 50 are provided with a curved shoulder portion 52 designed to minimize bearing contact between said plate and the flights of an extruder screw. A shoulder portion of the type illustrated in FIGURE IV is particularly desirable where the chamfered circular plate is not separately powered for rotation but rather, is turned by the rotational and intermeshing action of the screw. When this is done the shoulder portion is located on the advanced side of the notch in the direction of rotation to provide minimum bearing contact between the notches of the chamfered circular plate and the flights of the screw.

In FIGURES I and II, the chamfered circular plate 20 is driven by motor means 30. When motor means are utilized, it is necessary to synchronize the peripheral speed of the circular plate with the forwarding speed of the screw flights. Although the synchronization can be accomplished with separate power systems, such as electromechanical, servomechanisms, and the like, it is preferable to link the circular plate and the screw to a single power source having essentially perfect synchronization mechanically such as illustrated in FIGURES I and II where a variable speed motor 54 drives a common sheave 56 via pulley system 58. Rotation of sheave 56 turns its own axial shaft 60 which is rotatably linked to screw 16 through gears, not shown, within gear box 62 while at the same time imparting rotational motion to center shaft 24 of the chamfered circular plate 20 via chain and sprocket drive system 64 and worm and worm gear 66 and 68 respectively.

The extruder casing 70 is slotted to provide an opening for circular plate 20 to engage the flights of the screw 16. In general, the cross-section of the slot 34 should be larger but substantially contiguous to the cross-section of chamfered circular plate 20 at the points of intersection. Leakage of materials through slot 34 may be further minimized by reducing the slot clearance with sealing materials such as Teflon, neoprene and the like.

In operation, particulate or powdered plastic materials are introduced into the bore of an extruder and conveyed by a rotating screw against the opposing planar surface of the chamfered circular plate. In this manner, random particulate motion of the material is translated to essentially forward motion in the direction of extruder discharge by the action of the screw flight and intermeshing plate. The circular plate, in effect, obstructs particulate motion about the screw axis with the result that the material is forcibly advanced forwardly parallel to the rotating screw by the action of the flights into the higher pressure zones of the extruder wherein fusion of the material takes place.

The extruder feed control apparatus is applicable to a wide range of plastic materials including many materials previously considered non-processable by existing extrusion methods. As indicated above, the extrusion efficiency on materials that exhibit low frictional coefficients is greatly increased by the described positive feeding action. Materials exhibiting low frictional coefficients are those which tend to slip within the extruder bore both interparticulately and in contact with the internal extruder surfaces, thereby reducing the gripping and forwarding action of the rotating screw. These materials may generally be described in terms of physical characteristics such as, fine particle-sized, flowable, flour-like, light and fluffy. Many of the low molecular weight olefinic compounds meet this type of description. In addition, there may be included materials that may be hard, spherical or bead-like in nature.

The chamfered circular plate which can be used in the practice of the present invention is of rigid construction to present a solid face or surface resisting the orbital advancement of plastic materials. The plate can be of unitary or divisional construction and should be fabricated from rigid materials such as various metals and alloys which have the capacity for high strength. Materials of construction, particularly recommended are steel, nickel and various alloys.

In the preferred embodiment, both the circular plate and the extruder screw are linked to a single power source. In this manner, a constant plate and screw speed ratio necessary for proper meshing may be maintained throughout a range of extruder speeds.

As the pressures of extrusion in many cases will be extremely high, the shaft-bearing members and other parts of the mechanism should be of rigid and high strength construction. Shear pin or other means of mechanical relief should be provided for maximum protection of the mechanical equipment.

The preferred location of the feed control apparatus is in lateral engagement with the screw flights immediately adjacent to the feed inlet of the extruder. However, this position may be varied for bottom or top engagement with the extrusion screw and may be positioned at varying distances from the feed inlet.

The sponsored apparatus contributes high efficiency to extruder operations and yet is simple in operation and serves to minimize material feed fluctuations. Additionally, simplicity of the apparatus serves to reduce both operating costs and capital when compared to conventional means of handling the aforementioned problem materials.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description shall be interpreted as illustrative and not in a limiting sense.

What is claimed is:

1. In combination in an extruder, an elongated casing defining a lengthwise bore and having an inlet for solid materials, a rotatable screw mounted within said bore and provided with solid helical flights, a rotatable member comprising a circular plate, chamfered and notched at intervals along its peripheral edge, positioned to intersect said casing through a slot substantially adjacent said inlet and to mesh with the flights of said screw and a variable speed motor linked to synchronizing means for rotating both the screw and circular plate at a predetermined speed ratio.

2. In combination in an extruder, an elongated casing defining a lengthwise bore and having an inlet for solid materials, a rotatable screw mounted within said bore and provided with solid helical flights, a rotatable member comprising a circular plate, chamfered and notched at intervals along its peripheral edge, positioned to intersect said casing through a slot substantially adjacent said inlet and to mesh with the flights of said screw and a variable speed motor geared to rotate a common sheave, said common sheave adapted to rotate both the screw and circular plate at a predetermined speed ratio.

References Cited in the file of this patent

FOREIGN PATENTS

| | | |
|---|---|---|
| 513,692 | Belgium | Sept. 15, 1962 |
| 501,755 | Italy | Nov. 25, 1954 |